US012471841B1

(12) United States Patent
Allison et al.

(10) Patent No.: US 12,471,841 B1
(45) Date of Patent: Nov. 18, 2025

(54) HAPTIC HEALTHCARE PATIENT GARMENT

(71) Applicant: T-Mobile Innovations LLC, Overland Park, KS (US)

(72) Inventors: Kurtis Michael Allison, Topeka, KS (US); Zhisheng Chen, Overland Park, KS (US); Joao Teixeira, Shawnee, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 864 days.

(21) Appl. No.: 17/233,402

(22) Filed: Apr. 16, 2021

(51) Int. Cl.
*A61B 5/00* (2006.01)
*A41D 13/12* (2006.01)
(Continued)

(52) U.S. Cl.
CPC ........ *A61B 5/4836* (2013.01); *A41D 13/1245* (2013.01); *A41D 13/1281* (2013.01); *A61B 5/002* (2013.01); *A61B 5/0022* (2013.01); *A61B 5/02055* (2013.01); *A61B 5/14532* (2013.01); *A61B 5/4266* (2013.01); *A61B 5/6805* (2013.01); *A61B 5/746* (2013.01); *A61B 5/7465* (2013.01); *G16H 20/30* (2018.01); *A41D 2300/20* (2013.01); *A41D 2400/322* (2013.01); *A61B 2560/0462* (2013.01); *A61B 2562/0219* (2013.01)

(58) Field of Classification Search
CPC ..... A61B 5/4836; A61B 5/002; A61B 5/0022; A61B 5/02055; A61B 5/14532; A61B 5/4266; A61B 5/6805; A61B 5/746; A61B 5/7465; A61B 2560/0462; A61B 2562/0219; A61B 5/01; A61B 5/0536; A61B 5/256; A61B 5/282; A61B 2560/0214; A61B 2560/0247; A61B 2560/0252; A61B 2560/0431; A41D 13/1245; A41D 13/1281; A41D 2300/20; A41D 2400/322; G16H 20/30; G16H 40/63; G06F 1/163; G01K 13/20
See application file for complete search history.

(56) References Cited

U.S. PATENT DOCUMENTS

| | | | |
|---|---|---|---|
| 2012/0238901 A1* | 9/2012 | Augustine | A61B 5/01 600/549 |
| 2016/0133151 A1* | 5/2016 | O'Dowd | G08B 7/02 434/236 |

(Continued)

*Primary Examiner* — Adam Z Minchella
*Assistant Examiner* — Ashleigh Lauren Kern

(57) ABSTRACT

A haptic healthcare patient garment. The garment comprises a cloth an inflatable bladder, a radio transceiver, a plurality of sensors, a display, a processor communicatively coupled to the inflatable bladder, to the radio transceiver, to the sensors, and to the display, a memory communicatively coupled to the processor, and an application stored in the non-transitory memory that, when executed by the processor receives vital signs indications from the sensors, presents a plurality of vital signs values on the display, receives a command via the radio transceiver to provide a hug to a patient wearing the haptic healthcare patient garment, in response to receiving the command to provide a hug, causes the inflatable bladder to inflate, and causes the inflatable bladder to deflate, whereby the patient is given a hug by the garment from a remote well-wisher.

19 Claims, 6 Drawing Sheets

(51) Int. Cl.
    *A61B 5/0205*     (2006.01)
    *A61B 5/145*     (2006.01)
    *G16H 20/30*     (2018.01)

(56) References Cited

U.S. PATENT DOCUMENTS

| | | | | |
|---|---|---|---|---|
| 2017/0367917 | A1* | 12/2017 | Donat | G16H 40/67 |
| 2018/0098732 | A1* | 4/2018 | Williamson | G16H 80/00 |
| 2018/0317573 | A1* | 11/2018 | Devito | H05B 3/342 |
| 2019/0111307 | A1* | 4/2019 | White | D04B 1/24 |
| 2019/0132948 | A1* | 5/2019 | Longinotti-Buitoni | A61B 5/6805 |

* cited by examiner

HAPTIC HEALTHCARE PATIENT GARMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advances in technology have been applied to healthcare in various ways. Sophisticated diagnostics tools have been developed based on new technology. Healthcare professionals are trained to use these new tools in the performance of their tasks. As technology advances, new opportunities for improving healthcare delivery emerge.

SUMMARY

In an embodiment, a haptic healthcare patient garment is disclosed. The haptic healthcare patient garment comprises a cloth configured to enclose an upper human body, an inflatable bladder retained by the cloth, a radio transceiver retained by the cloth, a plurality of sensors retained by the cloth, a display retained by the cloth, a processor communicatively coupled to the inflatable bladder, to the radio transceiver, to the sensors, and to the display, a memory communicatively coupled to the processor; and an application stored in the non-transitory memory. When executed by the processor, the application receives vital signs indications from the sensors, presents a plurality of vital signs values on the display, receives a command via the radio transceiver to provide a hug to a patient wearing the haptic healthcare patient garment, in response to receiving the command to provide a hug, causes the inflatable bladder to inflate, and causes the inflatable bladder to deflate, whereby the patient is given a hug by the garment from a remote well-wisher.

In another embodiment, a method of providing healthcare to a patient is disclosed. The method comprises wrapping a patient in a smart healthcare garment, wherein the garment retains a radio transceiver, a plurality of vital signs sensors, a plurality of heaters, a plurality of garment color transducers, and a processor, receiving indications of vital signs from the vital signs sensors by an application executing on the processor, transmitting values of the vital signs by the application via the radio transceiver to an electronic device used by a healthcare worker to monitor the patient, commanding one of the garment color transducers by the application to assume a first color indicating healing progress in the proximate area of the patient, and commanding one of the plurality of heaters by the application to generate heat.

In yet another embodiment, a haptic healthcare patient garment is disclosed. The haptic healthcare patient garment comprises a cloth configured to enclose an upper human body, a plurality of heaters retained by the cloth, an audio alerting device, a radio transceiver retained by the cloth, a plurality of sensors retained by the cloth, a processor communicatively coupled to the heaters, to the audio alerting device, to the radio transceiver, to the sensors, and to the display, a non-transitory memory communicatively coupled to the processor, and an application stored in the non-transitory memory. When executed by the processor, the application receives vital signs indications from the sensors, transmits indications of vital signs via the radio transceiver to a monitoring device, receives a command via the radio transceiver to increase heat to a patient wearing the haptic healthcare patient garment, in response to receiving the command to increase heat to the patient, commands at least one of the heaters to deliver increased heat, monitoring a position of the patient's body, determines that the position of the patient's body is adverse to healing, and based on determining the adverse position of the patient's body, causes the audio alerting device to sound.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
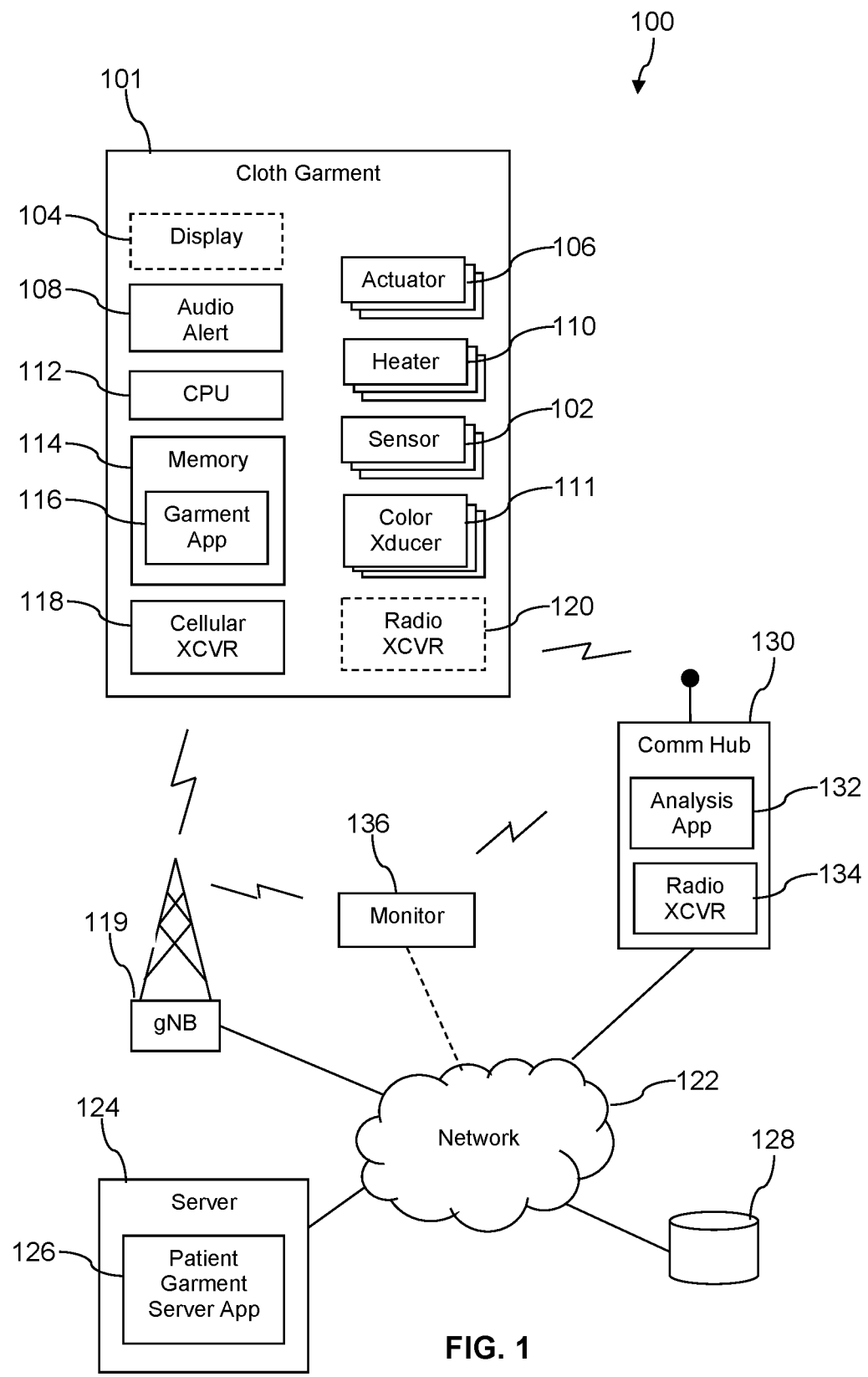
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A haptic healthcare patient garment is taught that can improve the experience of a patient receiving healthcare by freeing the patient from a jumble of attachments such as sensor wires and by cheering the patient up, for example by administering a hug to the patient via an actuator(s) embedded in the garment. In an embodiment, the garment is worn by the patient. A variety of functions of the garment are contemplated which need not all be implemented in the same garment. The garment may retain sensors to take the patients vitals and make them instantly available to an attending nurse, for example on a display screen on the outside of the garment or by transmitting the vitals via a wireless link to a wireless device used by the nurse. This aspect of the garment could replace the tangle of wires and sensors that sometimes drape over a hospital patient.

In an embodiment, the garment tracks a history of events, such as the patient falling. For example, the garment may retain accelerometers that monitor motions and accelerations of the patient. The garment may monitor healing and exhibit a contrasting color on an outside of the garment proximate to an injury of the patient that indicates if the injury is healing normally, if the injury is completely healed, or if a new injury has occurred. A patient may be cheered by being able to see healing progressing in this way, and the patient's improved mood may in fact contribute to a more rapid healing and recovery of the patient.

The garment could embed actuators that provide therapy, such as regionalized vibration or heating or cooling. The garment may track motion of the patient, determine when an undesirable position of an arm or a leg is being assumed, and present an audible alert or warning to prompt the patient to avoid the undesirably position. For example, if the patient has a hyper extended elbow or knee, it may be undesirable for this patient to extend his or her arm or leg too far, and an aural alert can assist in avoiding this motion which risks reinjuring the arm or leg. In an embodiment, the garment may be able to resist the patient moving an arm or a leg or his or her neck in an undesirable way. For example, the garment may be able to stiffen in certain directions, in response to command from a processor executing a computer program or other logic instructions, to resist undesired movements. The garment may issue alerts or aural warnings when the patient is violating rules or not following recommendations. For example, if the patient is urged to get up out of bed and walk around the room once per hour, the garment can monitor this activity and alert the patient if the time interval passes without doing this activity.

The garment may deliver "hugs" to the patient, under command from a processor executing a computer program or other logic instructions, for example by inflating or compressing in targeted areas and providing a sense of warmth (potentially from a heater element). The garment may embed a processor, a memory containing a computer program or logic instructions, and a radio transceiver. The processor may capture sensor values and transmit them via the radio transceiver, for example vital signs of the patient. The processor may receive commands via the radio transceiver, for example from a hub electronic device located in the patient's room, where the hub device may receive hug commands from authorized family members.

The processor may be able to receive programming instructions via the radio transceiver and reconfigure some of the computer program and/or logic stored in the memory to customize the functionality of the garment to a specific patient need. For example, patient's recovering from surgery may need to be warmed up by heaters or heater elements embedded in the garment, while patient's recovering from a muscular injury may need to have localized cooling applied at the spot of muscular injury to reduce inflammation and encourage healing. The haptic healthcare patient garment is a specific technical solution to a technical problem of providing healthcare to a patient while maintaining the patient's positive mental attitude which contributes to the healing process.

Turning now to FIG. 1, a communication system 100 is described. In an embodiment, the system 100 comprises a cloth garment 101, a plurality of sensors 102, an optional display 104, a plurality of actuators 106, one or more audio alert 108, a plurality of heaters 110, a plurality of color transducers 111, a processor 112, a memory 114 storing a garment application 116 in a non-transitory memory portion, a cellular radio transceiver 118, and an optional radio transceiver 120. The cloth garment 101 may retain one or more of the devices 102-120, for example within a closed or sewn pocket of the garment 101. Some of the devices 102-120 may be adhered to or secured to the cloth garment 101 with attachment hardware such as clips or buttons or rivets. A source of electric power such as a battery (not shown) may be retained or attached to the cloth garment 101 and may provide electric power to the devices 102-120. In some contexts, the cloth garment 101 and devices 102-120 may be referred to as a smart healthcare garment.

The cloth garment 101 may have the form of a jacket. The cloth garment 101 may have the form of a coverall or jumpsuit. The cloth garment 101 may allow the patient to don the garment 101 and then close securely as with buttons or a zipper. The cloth garment 101 may be close and/or tightly fitted against the patient's body. The cloth garment 101 may be a sleeve that envelopes an arm or a leg of a healthcare patient. A plurality of sleeves may be worn by a healthcare patient at the same time, for example a sleeve on each arm, a sleeve on each leg, or a sleeve on each arm and each leg.

The cellular radio transceiver 118 may receive a wireless communication link from a cell site 119 that communicatively couples the cellular radio transceiver 118 to a network 122. The cell site 119 may provide a wireless communication link to the cellular radio transceiver 118 according to a 5G, a long-term evolution (LTE), a code division multiple access (CDMA), and/or a global system for mobile communications (GSM) telecommunication protocol. In an embodiment, the cellular radio transceiver 118 is configured to establish a wireless communication link with the cell site 119 according to a 5G, a long-term evolution (LTE), a code division multiple access (CDMA), and/or a global system for mobile communications (GSM) telecommunication protocol. The network 122 comprises one or more public networks, one or more private networks, or a combination thereof. In an embodiment, a portion of the network 122 is a 5G network. 5G networks are described further hereinafter with reference to FIG. 4A and FIG. 4B.

The garment application 116 may be a computer program or logic instructions that are executed by the processor 112. While a single garment application 116 is described herein, it is understood that the functionality described herein as performed by the application 116 may be performed by a plurality of applications executed by the processor 112. In an embodiment, the processor 112 and/or the garment application 116 may interact with the sensors 102, the display 104, the actuators 106, the audio alert 108, the heaters 110, the cellular radio transceiver 118, and/or the radio transceiver 120 through device drivers. In an embodiment, the garment application 116 communicates with a patient garment server application 126 that executes on a computer 124. Computers are described further hereinafter with reference to FIG. 5. The patient garment server application 126 may provide high complexity execution on behalf of the garment application 116 (e.g., the garment application 116 may behave as a client requesting services to be performed for it by the patient garment server application 126). The patient garment server application 126 may mediate and/or broker messages received via the network 122 and send commands based on these received messages on to the patient garment application 116, for example hug commands.

In an embodiment, the system 100 comprises a communication hub 130 that may be located proximate to the cloth garment 101, for example in a treatment room or a recovery room of a healthcare facility such as a hospital or an out-patient-care facility. The communication hub 130 comprises an analysis application 132 and a radio transceiver 134. The radio transceiver 134 may establish a wireless communication link with the radio transceiver 120 associated with the cloth garment 101. The wireless communication link between the radio transceivers 120, 134 may be a WiFi communication link, a BlueTooth communication link, or another short-range wireless communication link (e.g., short-range in comparison with typical cellular wireless links). In an embodiment, the radio transceiver 120 is a WiFi radio transceiver or a BlueTooth radio transceiver.

In an embodiment, the analysis application 132 may receive patient indications (e.g., vital signs and other metrics) produced by the sensors 102 and transmitted from the radio transceiver 120 associated with the cloth garment 101 to the radio transceiver 134 of the communication hub 130. The analysis application 132 may process these indications to produce smoothed values and to convert into standard units. The analysis application 132 may transmit these smoothed and converted values back to the patient garment application 116 via the radio transceiver 120, and the patient garment application 116 may present these values on the display 104. This may promote a healthcare worker easily knowing the vital signs or other metrics of the patient at a glance on the display 104. The analysis application 132 may store these values and generate a history of these values. The analysis application 132 may transmit these values and/or the history of these values to a datastore 128 that may be accessed by healthcare personnel assigned to treat the subject patient, for example using applications executing on laptop computers or mobile communication devices.

The communication hub 130 and/or the analysis application 132 may receive a request from a third party from the network 122, for example from a family member who has sent the request from an electronic device, to give a hug to the patient. The communication hub 130 may send the command to provide a hub to the patient garment application 116, and the patient garment application 116 may command the actuators 106 and/or the heaters 110 to give the patient a hug.

The system 100 may further comprise a monitor 136 that is able to display the vital signs of the patient. The monitor 136 may receive these vital signs via a cellular wireless communication link to the cell site 119, via a wireless communication link to the communication hub 130, or via a wired communication link to the network 122. In an embodiment, the monitor 136 may be provided by a portable device that is carried by or worn by a healthcare worker responsible for providing care to the patient wearing the cloth garment 101. In an embodiment, the patient garment application 116 may detect an adverse condition of the patient based on the vital signs of the patient and transmit an alarm message via the cellular radio transceiver 118 or via the radio transceiver 120 to a healthcare worker, for example via the monitor 136. An adverse condition may be that the patient's temperature is too high or too low. An adverse condition may be that the patient's O2 saturation is too low. An adverse condition may be that the patient's blood sugar level is out of limits. An adverse condition may be that the patient's blood pressure is out of limits. An adverse condition may be that the patient's electrocardiogram is abnormal, for example is in an arrhythmic pattern.

Figure 2:
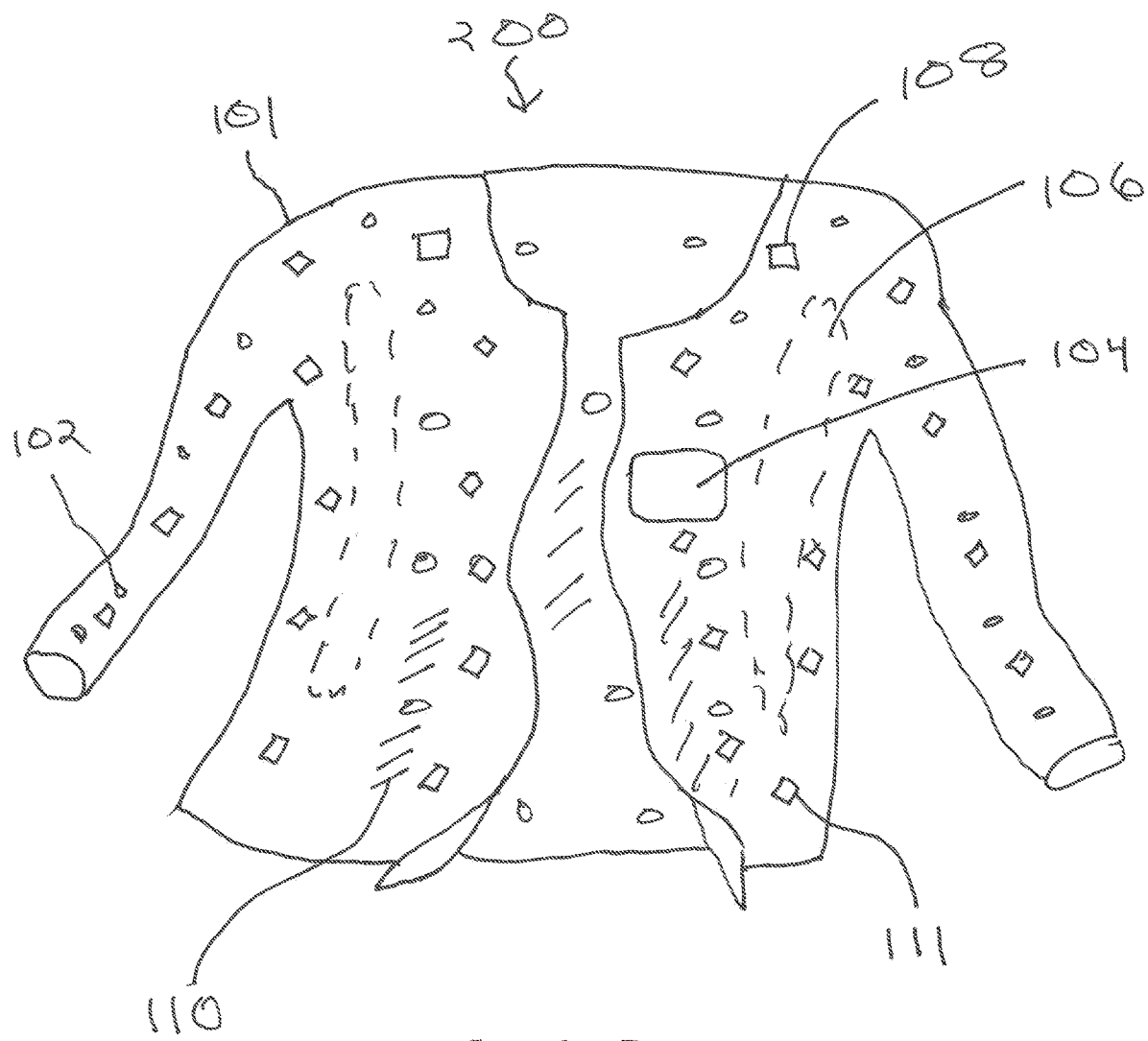
FIG. 2 is an illustration of a haptic healthcare patient garment according to an embodiment of the disclosure.

Turning now to FIG. 2, a haptic healthcare patient garment 200 is described. It is understood that the haptic healthcare patient garment 200 is a detailed view of the corresponding elements of FIG. 1. In an embodiment, the haptic healthcare patient garment 200 is a long-sleeved shirt or jacket that can be donned by a patient and fastened or closed so that the garment 200 fits snuggly to the patient's arms, shoulders, chest, and torso. The snug fit may promote maintaining the sensors 102 in contact with a skin of the patient, whereby the sensors 102 can better sense the vital signs of the patient. The fit of the garment 200 may additionally promote maintaining the sensors 102 located optimally for picking up vital signs, for example locating electrocardiogram sensors at suitable locations on the torso of the patient. In an embodiment, the sensors 102 comprise one or more of a temperature sensor, an O2 saturation sensor, a blood pressure sensor, a pulse rate sensor, a set of electrocardiogram sensors, a blood sugar sensor, a blood thickness sensor, one or more accelerometers, and/or a perspiration sensor. In an embodiment, the sensors 102 comprise at least three different types of sensors selected from the list consisting of a temperature sensor, an O2 saturation sensor, a blood pressure sensor, a pulse rate sensor, a set of electrocardiogram sensors, a blood sugar sensor, a blood thickness sensor, one or more accelerometers, and a perspiration sensor Some of the actuators 106 may be inflatable bladders. When the garment 200 fits snuggly to the patient and is closed, as with buttons or a zipper or with snaps, if the actuators 106 inflate, the patient is squeezed in the areas proximate to the bladders. This may create the sensation of a friendly, affectionate hug, which may lift the spirits of the patient. The actuators 106 may be implemented with other devices, for example a long shape memory alloy coil (SMAc) may be actuated by an electric current to contract, and if suitably anchored within the cloth garment 101, this contraction can effectively squeeze the patient. The heaters 110 may operate in concert with the actuators 106 to provide a modest heating effect, which may contribute to the illusion of receiving a hug.

The actuators 106 and/or the heaters 110 may provide therapeutic treatments to a patient, for example loosening up muscles to promote blood flow and promote recovery from an injury. In an embodiment, the heaters 110 may be able to cool a patient. In an embodiment, some of the heaters 110 are electric resistance type heats. In an embodiment, some of the heaters 110 may be far infrared type heaters. Far infrared waves may have additional positive therapeutic effects on patients in addition to providing a comfortable body temperature. The heaters 110 may be controllable by the patient garment application 116 to provide localized heating or cooling to a specific area of a patient's body to promote healing of an injury at that location. The patient garment application 116 may receive a command to deliver heat to the patient, for example from the patient garment server application 126 and/or from the analysis application 132. The heaters 110 may provide warmth to a patient recovering from surgery when the patient may feel chilled because of effects of anesthesia. The audio alert 108 may be located on a shoulder or on both shoulders of the garment 200, whereby to be close to the patient's ears. The display 104 may be located on a middle front portion of the garment 200, whereby to be more readily seen by a healthcare worker providing care to the patient.

In an embodiment, the actuators 106 may be used to provide a gentle message to aid a patient going to sleep, to provide periodic massage at a certain part of a patient's body after surgery to help reduce pain, or to promote improved blood circulation. The actuators 106 may be commanded by the garment application 116, for example, to actuate and deactivate in a particular sequence that produces a wave across the body of the patient. In an embodiment, the actuators 106 may comprise a plurality of different type of actuators. Some actuators 106 could provide simulated electronic acupuncture therapy to a patient. Some actuators 106 could provide magnetic field and/or ultrasound physiotherapy to a patient. Some actuators 106 could be vibrators.

The garment application 116 may be preprogrammed with routines that support the hug effect as well as the physiotherapies described here such that the garment application 116 may be commanded to perform the hug or a specified therapy and the garment application 116 is able to translate this high-level abstract command into the more complicated sequence of actuations of the actuators 106 to provide the commanded action. In an embodiment, the patient garment server application 126 may issue the high-level abstract command to perform a hug or therapy. In an embodiment, the low-latency feature of 5G communication networks can provide support for time synchronization, for example in synchronization with a cell phone call between a family member and the patient receiving the hug. For example, a low-latency network slice supported by the 5G communication network may be used to support such time synchronization. In an embodiment, the analysis application 132 may issue the high-level abstract command to perform a hug or therapy.

The high-level abstract command to perform a hug may entail commanding some of the actuators 106 to activate in a particular sequence. For example, the actuators 106 that are either inflatable bladders or SMAc devices may be retained in the cloth garment 101 symmetrically located about a vertical axis of the cloth garment 101 (e.g., when the cloth garment 101 is donned by a patient, the vertical axis of the cloth garment 101 would be substantially parallel to the spinal column of the patient). The garment application 116 may command a first left actuator 106 and a symmetrically located first right actuator 106 to activate, then command a second left actuator 106 and a symmetrically located second right actuator 106 to activate, and then command a third left actuator 106 and a third right actuator 106 to activate. In this way, the sensation of a hug may be built up as a time-sequenced increase of pressure exerted against the body by the actuators 106 and/or by the garment 101 retaining the actuators 106. When the hug has completed, the actuators 106 may be deactivated in the reverse sequence: the third left actuator 106 and the third right actuator 106 may deactivate first, the second left actuator 106 and the second right actuator 106 may deactivate second, and the first left actuator 106 and the first right actuator 106 may deactivate last. In an embodiment, the high-level abstract command to perform the hug may further entail activating heaters 110 proximate the actuators 106 engaged in the hug in the same time sequence. The heaters 110 may be located symmetrically about the vertical axis of the cloth garment 101.

In an embodiment, the cloth garment 101 comprises a plurality of color transducers 111 that are communicatively coupled to the processor 112 and controllable by the garment application 116 when it is executed by the processor 112. In an embodiment, the color transducers 111 are located only on a front-facing side of the cloth garment 101 where a patient wearing the cloth garment 101 can see the color they present and are not located where the patient could not see them (e.g., on a back-facing side of the cloth garment 101). When a high-level abstract hug command is executed by the garment application 116, the garment application 116 may command color transducers 111 proximate to the actuators 106 and/or heaters 110 to activate in coordination with the activation of the actuators 106 and/or the activation of the heaters 110. In an embodiment, the color which is commanded is different from the neutral color of the cloth garment 101. For example, the cloth garment 101 when in a neutral color state may have a grey color. The color transducers 111 may make the cloth garment assume different colors such as green, orange, red, yellow, blue, purple, and other colors. In an embodiment, hugs commanded by different persons (e.g., different family members associated with the patient) may be signaled by different color transitions by the cloth garment 101. Said in other words, the garment application 116 may command the color transition associated with administering a hug to produce different colors based on who originates the hug command. In an embodiment, the garment application 116 is able to detect if a patient wearing the cloth garment 101 is in the middle of a healthcare worker visit, in the middle of a medical procedure, or is sleeping and can queue the hug for delivery later, after the blocking circumstances passes (e.g., until after the healthcare worker visit, after the medical procedure is completed, or after the patient awakens from sleep).

With reference now to both FIG. 1 and FIG. 2, the cloth garment 101 may be able to present or to assume a color that is controlled from the patient garment application 116, for example, when the garment application 116 commands the color transducers 111 to assume the specific color. The patient garment application 116 may determine, or be informed by a message received from the analysis application 132 executing on the communication hub 130, that healing is progressing in the patient at a specific location. The patient garment application 116 accordingly may command a region of the cloth garment 101 to assume a color indicative of this healing, for example commanding that a green color presented by color transducers 111 located in the particular region. In an embodiment, a progression of different colors or shades of colors may be presented as the healing advances. For example, if a patient's elbow is injured, the cloth garment 101 proximate to the elbow may initially present red, change to orange, change to blue, and then change to green when healing is complete or nearly complete. In another embodiment, a different sequence of colors may be used to represent stages of injury recovery.

In an embodiment, the color of the cloth garment 101 as a whole may be commanded by the patient garment application 116 to assume a color that is desired by the patient, for example a favorite color of the patient. Alternatively, the color may be a color deemed by treating healthcare workers to be cheerful, whereby to cheer up a depressed or saddened patient.

In an embodiment, the patient garment application 116 and/or the analysis application 132 may process indications from sensors 102 (e.g., accelerometers) to determine a position of limbs or neck of the patient. These indications may be used to determine by the patient garment application 116 that the patient is moving in an undesirable way or assuming a bodily position, for example extending a forearm that has been hyperextended and thereby threatening recovery from the hyperextension injury. In this case, the patient garment application 116 and/or the analysis application 132 may command the audio alert 108 to sound, warning the patient of the adverse position he or she is moving into so they can correct this position. These undesirable positions may be referred to as adverse positions in some contexts herein.

In an embodiment, the patient garment application 116 and/or the analysis application 132 may process indications from sensors 102 to determine actions taken by the patient, for example walking to the bathroom or for example falling on the floor. The history of such actions can be recorded by the patient garment application 116 and stored in the memory 114 and/or transmitted to the datastore 128. The history of such actions can be recorded by the analysis application 132 and stored in the datastore 128. It is noted that one of the benefits of the haptic healthcare patient garment 200 is that the patient may be freed from the entanglement of wires and plug-ins that conventionally have been used to monitor patient vital signs closely. The patient need not unplug to move about, for example to go to the bathroom. The patient need not drag along with him or her monitoring apparatus when going to the bathroom or when getting some exercise walking in the halls of the healthcare facility.

In an embodiment, the garment application 116 receives a command via the cellular radio transceiver 118 or the radio transceiver 120 to provide a massage to the patient and, in response to receiving the command to provide the massage, commands at least some of the actuators 106 to activate to massage the patient. In an embodiment, the garment application 116 receives a command via the cellular radio transceiver 118 or the radio transceiver 120 to provide physiotherapy to the patient and, in response to receiving the command to provide physiotherapy, commands at least some of the actuators 106 to activate to provide simulated electronic acupuncture physiotherapy, magnetic field physiotherapy, or ultrasound physiotherapy to the patient.

Figure 3:
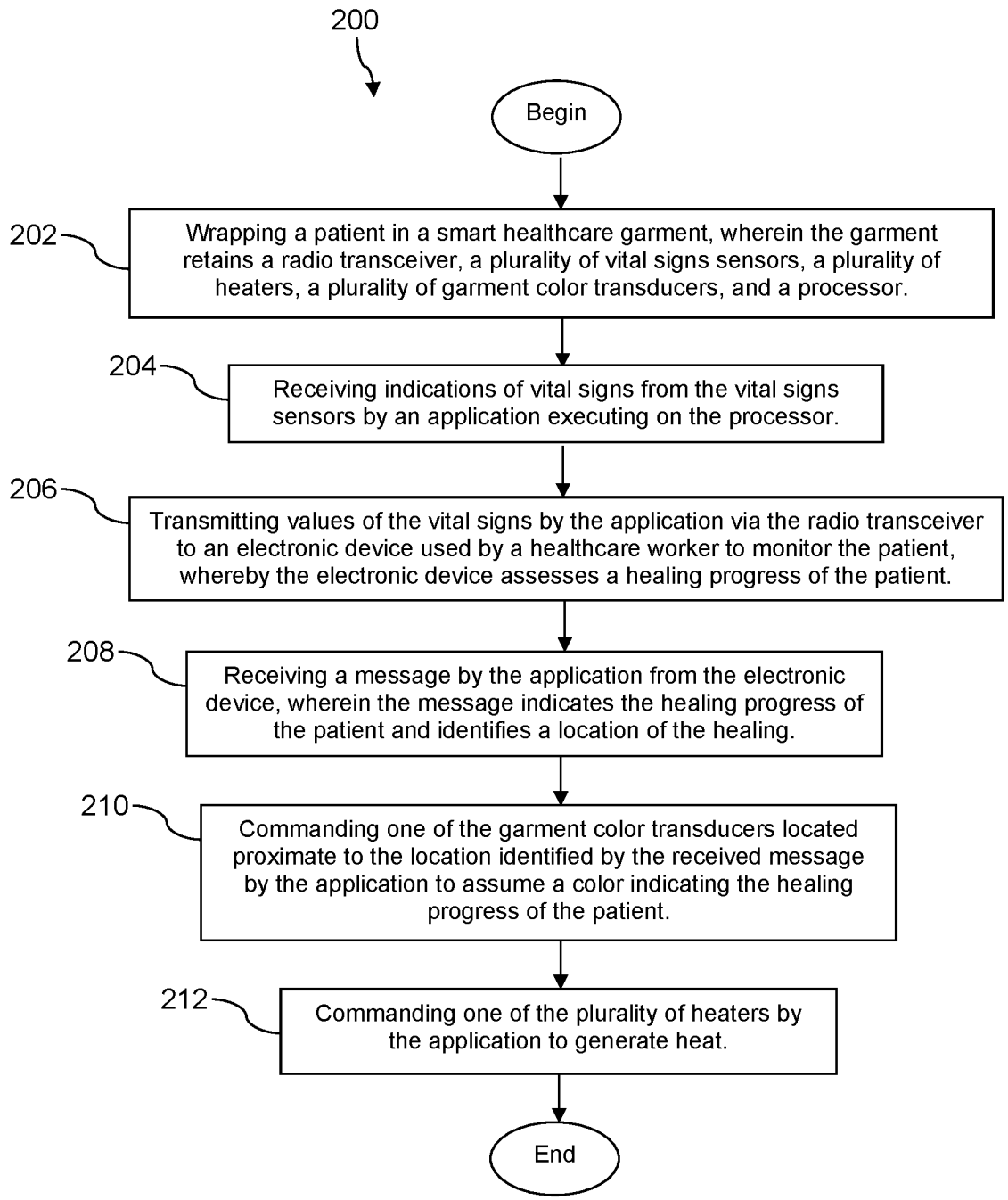
FIG. 3 is a flow chart of a method according to an embodiment of the disclosure.

Turning now to FIG. 3, a method 200 is described. In an embodiment, the method 200 is a method of providing healthcare to a patient. At block 202, the method 200 comprises wrapping a patient in a smart healthcare garment, wherein the garment retains a radio transceiver, a plurality of vital signs sensors, a plurality of heaters, a plurality of garment color transducers, and a processor. In an embodiment, the smart healthcare garment is a blanket. In another embodiment, the smart healthcare garment is a jacket.

At block 204, the method 200 comprises receiving indications of vital signs from the vital signs sensors by an application executing on the processor. At block 206, the method 200 comprises transmitting values of the vital signs by the application via the radio transceiver to an electronic device used by a healthcare worker to monitor the patient, whereby the electronic device assesses a healing progress of the patient. For example, the patient garment server application 126 or the analysis application 132 analyzes the vital signs to determine if the patient is healing. The analysis of healing may be based on one or more of temperature readings, blood pressure readings, heartbeat rate readings received in the form of vital sign values received from the application executing on the processor of the smart healthcare garment. The electronic device (e.g., the patient garment server application executing on the server 124 or the analysis application 132 executing on the communication hub 130), may determine a location of the healing or a focus point of the healing. In an embodiment, the location of the healing is predefined, for example defined by an initial patient health assessment. In an embodiment, the location of the healing is determined by analysis of different data provided by differently located vital signs sensors retained by the smart healthcare garment.

At block 208, the method 200 comprises receiving a message by the application from the electronic device, wherein the message indicates the healing progress of the patient and identifies a location of the healing. For example, the location of the healing may be identified as the upper left arm.

At block 210, the method 200 comprises commanding one of the garment color transducers by the application to assume a color indicating the healing progress, where the garment color transducer is located proximate to the location identified by the received message. For example, the application may command a garment color transducer located proximate the upper left arm to assume the color indicating the healing progress. The color indicating the healing progress is different from a predominant color of the garment. For example, the garment may be predominantly grey in color, but the color indicating the healing progress may be green in color. In an embodiment, the intensity of the color indicating the healing progress may be coordinated with the state of healing progress. At block 212, the method 200 comprises commanding one of the plurality of heaters by the application to generate heat.

In an embodiment, the garment retains a plurality of actuators, and the method 200 further comprises receiving by the radio transceiver a command to give the patient wearing the smart healthcare garment a hug and commanding the actuators to activate by the application, whereby a hug is administered to the patient. In an embodiment, the garment retains an audio alerting device, and the method further comprises detecting by the application that the patient is assuming a posture contraindicated by the patient's physical condition and, based on detecting the contraindicated posture, commanding the audio alerting device to sound by the application.

Figure 4A:
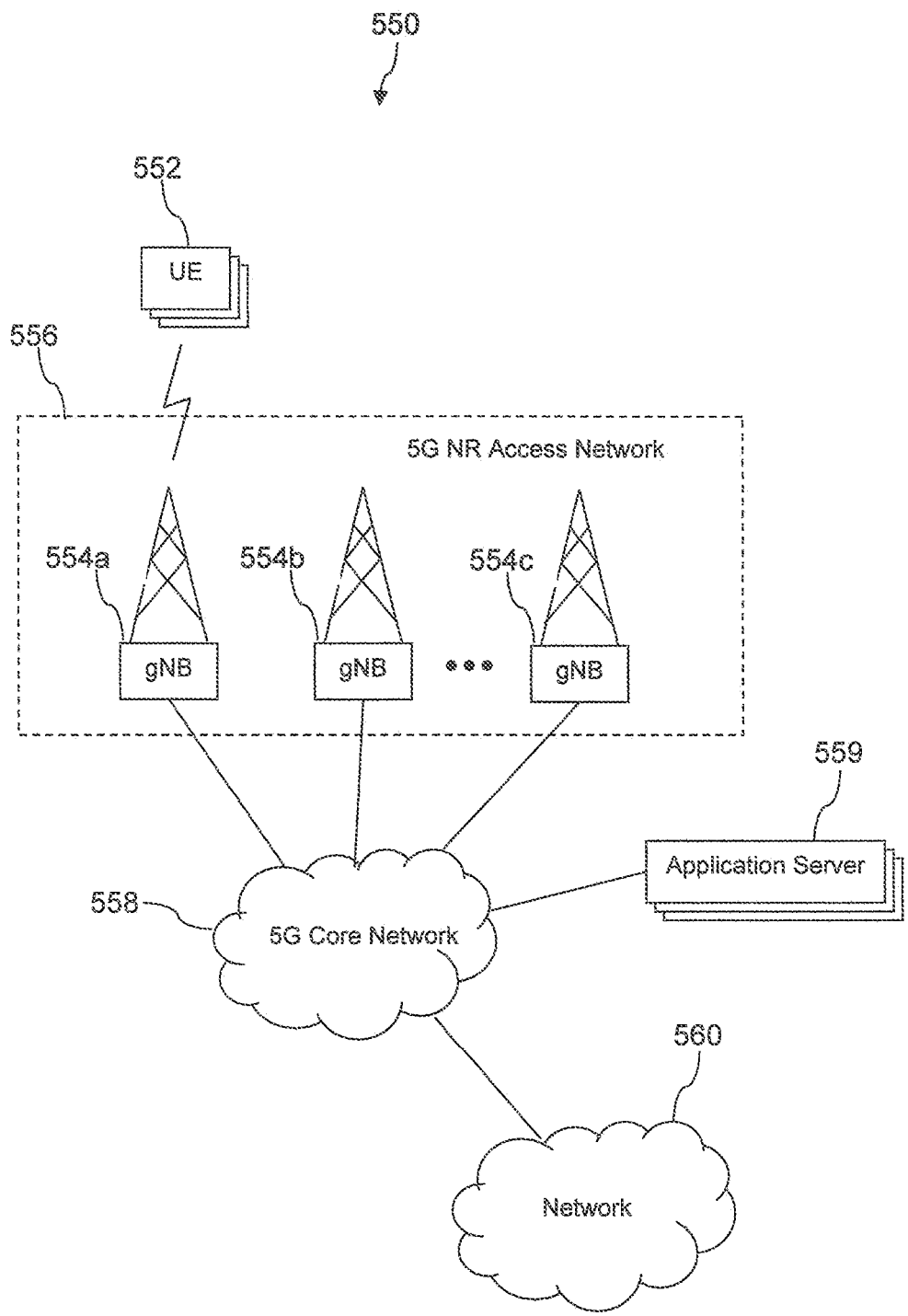
FIG. 4A and FIG. 4B is a block diagram of a communication network according to an embodiment of the disclosure.

Turning now to FIG. 4A, an exemplary communication system 550 is described. Typically the communication system 550 includes a number of access nodes 554 that are configured to provide coverage in which UEs 552 such as cell phones, tablet computers, machine-type-communication devices, tracking devices, embedded wireless modules, and/or other wirelessly equipped communication devices (whether or not user operated), can operate. The access nodes 554 may be said to establish an access network 556. The access network 556 may be referred to as a radio access network (RAN) in some contexts. In a 5G technology generation an access node 554 may be referred to as a gigabit Node B (gNB). In 4G technology (e.g., long term evolution (LTE) technology) an access node 554 may be referred to as an evolved Node B (eNB). In 3G technology (e.g., code division multiple access (CDMA) and global system for mobile communication (GSM)) an access node 554 may be referred to as a base transceiver station (BTS) combined with a base station controller (BSC). In some contexts, the access node 554 may be referred to as a cell site or a cell tower. In some implementations, a picocell may provide some of the functionality of an access node 554, albeit with a constrained coverage area. Each of these different embodiments of an access node 554 may be considered to provide roughly similar functions in the different technology generations.

In an embodiment, the access network 556 comprises a first access node 554a, a second access node 554b, and a third access node 554c. It is understood that the access network 556 may include any number of access nodes 554. Further, each access node 554 could be coupled with a core network 558 that provides connectivity with various application servers 559 and/or a network 560. In an embodiment, at least some of the application servers 559 may be located close to the network edge (e.g., geographically close to the UE 552 and the end user) to deliver so-called "edge computing." The network 560 may be one or more private networks, one or more public networks, or a combination thereof. The network 560 may comprise the public switched telephone network (PSTN). The network 560 may comprise the Internet. With this arrangement, a UE 552 within coverage of the access network 556 could engage in air-interface communication with an access node 554 and could thereby communicate via the access node 554 with various application servers and other entities.

The communication system 550 could operate in accordance with a particular radio access technology (RAT), with communications from an access node 554 to UEs 552 defining a downlink or forward link and communications from the UEs 552 to the access node 554 defining an uplink or reverse link. Over the years, the industry has developed various generations of RATs, in a continuous effort to increase available data rate and quality of service for end users. These generations have ranged from "1G," which used simple analog frequency modulation to facilitate basic voice-call service, to "4G"-such as Long Term Evolution (LTE), which now facilitates mobile broadband service using technologies such as orthogonal frequency division multiplexing (OFDM) and multiple input multiple output (MIMO).

Recently, the industry has been exploring developments in "5G" and particularly "5G NR" (5G New Radio), which may use a scalable OFDM air interface, advanced channel coding, massive MIMO, beamforming, mobile mmWave (e.g., frequency bands above 24 GHZ), and/or other features, to support higher data rates and countless applications, such as mission-critical services, enhanced mobile broadband, and massive Internet of Things (IoT). 5G is hoped to provide virtually unlimited bandwidth on demand, for example providing access on demand to as much as 20 gigabits per second (Gbps) downlink data throughput and as much as 10 Gbps uplink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

In accordance with the RAT, each access node 554 could provide service on one or more radio-frequency (RF) carriers, each of which could be frequency division duplex (FDD), with separate frequency channels for downlink and uplink communication, or time division duplex (TDD), with a single frequency channel multiplexed over time between downlink and uplink use. Each such frequency channel could be defined as a specific range of frequency (e.g., in radio-frequency (RF) spectrum) having a bandwidth and a center frequency and thus extending from a low-end frequency to a high-end frequency. Further, on the downlink and uplink channels, the coverage of each access node 554 could define an air interface configured in a specific manner to define physical resources for carrying information wirelessly between the access node 554 and UEs 552.

Without limitation, for instance, the air interface could be divided over time into frames, subframes, and symbol time segments, and over frequency into subcarriers that could be modulated to carry data. The example air interface could thus define an array of time-frequency resource elements each being at a respective symbol time segment and subcarrier, and the subcarrier of each resource element could be modulated to carry data. Further, in each subframe or other transmission time interval (TTI), the resource elements on the downlink and uplink could be grouped to define physical resource blocks (PRBs) that the access node could allocate as needed to carry data between the access node and served UEs 552.

In addition, certain resource elements on the example air interface could be reserved for special purposes. For instance, on the downlink, certain resource elements could be reserved to carry synchronization signals that UEs 552 could detect as an indication of the presence of coverage and to establish frame timing, other resource elements could be reserved to carry a reference signal that UEs 552 could measure in order to determine coverage strength, and still other resource elements could be reserved to carry other control signaling such as PRB-scheduling directives and acknowledgement messaging from the access node 554 to served UEs 552. And on the uplink, certain resource elements could be reserved to carry random access signaling from UEs 552 to the access node 554, and other resource elements could be reserved to carry other control signaling such as PRB-scheduling requests and acknowledgement signaling from UEs 552 to the access node 554.

The access node 554, in some instances, may be split functionally into a radio unit (RU), a distributed unit (DU), and a central unit (CU) where each of the RU, DU, and CU have distinctive roles to play in the access network 556. The RU provides radio functions. The DU provides L1 and L2 real-time scheduling functions; and the CU provides higher L2 and L3 non-real time scheduling. This split supports flexibility in deploying the DU and CU. The CU may be hosted in a regional cloud data center. The DU may be co-located with the RU, or the DU may be hosted in an edge cloud data center.

Figure 4B:
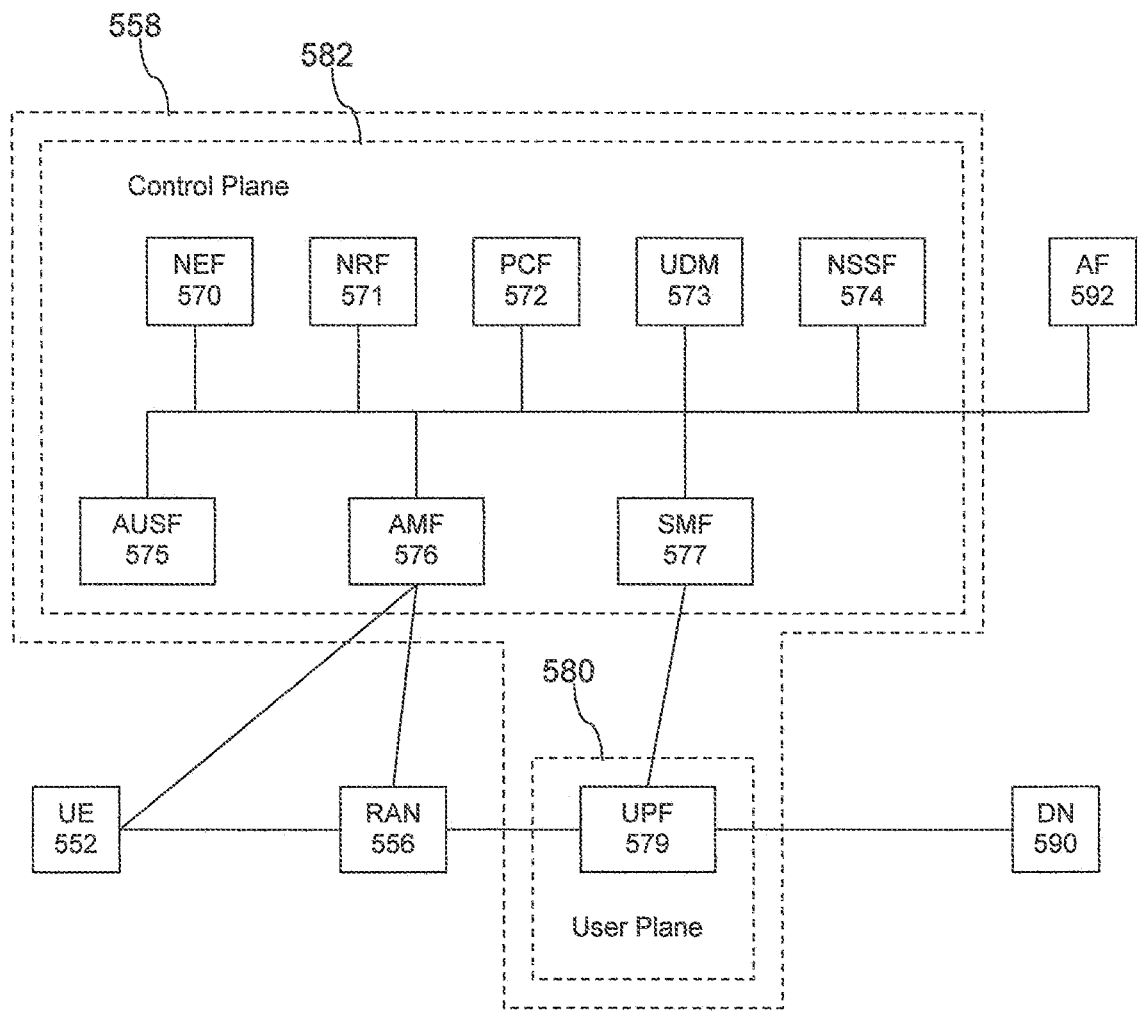

Turning now to FIG. 4B, further details of the core network 558 are described. In an embodiment, the core network 558 is a 5G core network. 5G core network technology is based on a service based architecture paradigm. Rather than constructing the 5G core network as a series of special purpose communication nodes (e.g., an HSS node, a MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 558 may be segregated into a user plane 580 and a control plane 582, thereby promoting independent scalability, evolution, and flexible deployment.

The UPF 579 delivers packet processing and links the UE 552, via the access network 556, to a data network 590 (e.g., the network 560 illustrated in FIG. 4A). The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow based charging control. The UDM 573 manages network user data and can be paired with a user data repository (UDR) that stores user data such as customer profile information, customer authentication number, and encryption keys for the information. An application function 592, which may be located outside of the core network 558, exposes the application layer for interacting with the core network 558. In an embodiment, the application function 592 may be execute on an application server 559 located geographically proximate to the UE 552 in an "edge computing" deployment mode. The core network 558 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 5:
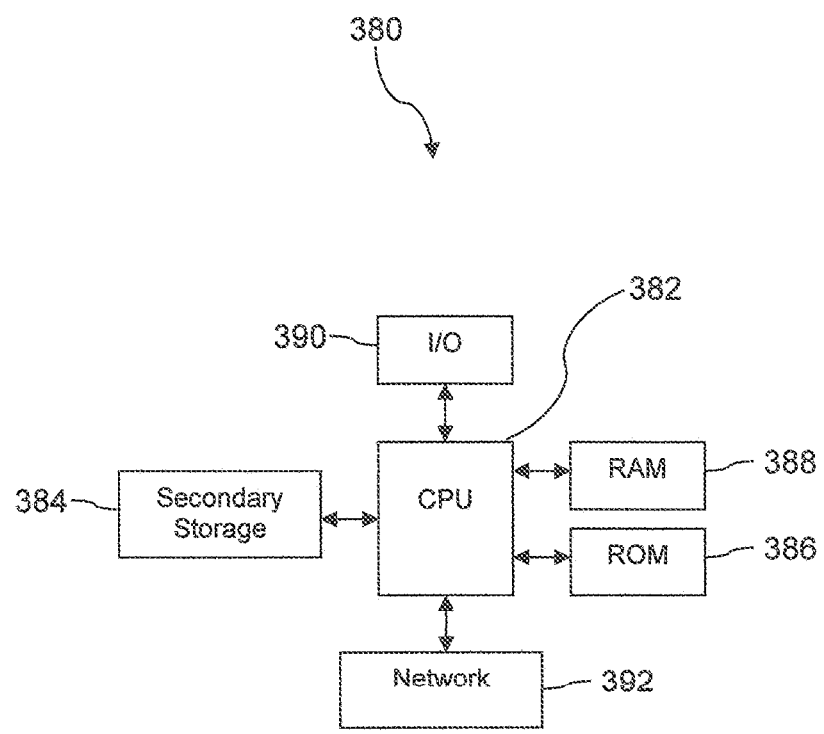
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WIFI (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A haptic healthcare patient garment, comprising:
   a cloth configured to enclose an upper human body;
   a plurality of heaters retained by the cloth;
   an audio alerting device;
   a radio transceiver retained by the cloth;
   a plurality of sensors retained by the cloth;
   a plurality of garment color transducers retained by the cloth;
   a processor communicatively coupled to the heaters, to the audio alerting device, to the radio transceiver, and to the sensors;
   a non-transitory memory communicatively coupled to the processor; and
   an application stored in the non-transitory memory that, when executed by the processor:
     receives vital signs indications from the sensors,
     transmits indications of vital signs via the radio transceiver to a monitoring device,
     receives a command via the radio transceiver to increase heat to a patient wearing the haptic healthcare patient garment,
     in response to receiving the command to increase heat to the patient, commands at least one of the heaters to deliver increased heat,
     monitors a position of the patient's body,
     determining that the position of the patient's body is adverse to healing,
     based on determining the adverse position of the patient's body, causes the audio alerting device to sound,
     transmits values of the vital signs via the radio transceiver to an electronic device used by a healthcare worker to monitor the patient, wherein the electronic device assesses a healing progress of the patient with respect to a physical injury located on the patient's body,
     receives a message from the electronic device, wherein the message indicates the healing progress of the patient and identifies a location of the healing proximate to the physical injury located on the patient's body, and
     commands a garment color transducer of the plurality of garment color transducers to assume a color indicating the healing progress, where the garment color transducer is located proximate to the location of the physical injury located on the patient's body as identified by the received message.

2. The haptic healthcare patient garment of claim 1, further comprising a plurality of actuators retained by the cloth, wherein the processor is communicatively coupled to the actuators, and the application, when executed by the processor, receives a command via the radio transceiver to provide a massage to the patient and, in response to receiving the command to provide the massage, commands at least some of the actuators to activate to massage the patient.

3. The haptic healthcare patient garment of claim 1, further comprising a plurality of actuators retained by the cloth, wherein the processor is communicatively coupled to the actuators, and the application, when executed by the processor, receives a command via the radio transceiver to provide physiotherapy to the patient and, in response to receiving the command to provide physiotherapy, commands at least some of the actuators to activate to provide simulated electronic acupuncture physiotherapy, magnetic field physiotherapy, or ultrasound physiotherapy to the patient.

4. The haptic healthcare patient garment of claim 1, wherein the heaters are electric resistance type heaters.

5. The haptic healthcare patient garment of claim 1, wherein the heaters are far infrared wave type heaters.

6. The haptic healthcare patient garment of claim 1, wherein the sensors comprise at least three items from the list consisting of a temperature sensor, an O2 saturation sensor, a blood pressure sensor, a pulse rate sensor, a set of electrocardiogram sensors, a blood sugar sensor, a blood thickness sensor, an accelerometer, and a perspiration sensor.

7. The haptic healthcare patient garment of claim 1, further comprising a plurality of actuators retained by the cloth, wherein the application, when executed by the processor:
   receives a command via the radio transceiver to provide a hug to the patient wearing the haptic healthcare patient garment, and
   in response to receiving the command to provide a hug, causes the actuators to activate in a coordinated sequence, whereby the patient is given a hug by the garment from a remote well-wisher.

8. The haptic healthcare patient garment of claim 7, wherein the actuators comprise an inflatable bladder, a long shape memory alloy coil (SMAc), a vibrator, or an ultrasound actuator.

9. The haptic healthcare patient garment of claim 7, wherein the actuators are located symmetrically about a vertical axis of the haptic healthcare patient garment, and activating the actuators in a coordinated sequence comprises activating symmetrically located actuators at the same time and in progressing time-sequence.

10. The haptic healthcare patient garment of claim 9, wherein the heaters are located symmetrically about the vertical axis of the haptic healthcare patient garment, and wherein the heaters are activated in coordination with the actuators that the heaters are proximate to.

11. The haptic healthcare patient garment of claim 7, wherein the application, when executed by the processor, detects that the patient wearing the haptic healthcare patient garment is undergoing a healthcare worker visit and delays causing the actuators to actuate to provide the hug until after the healthcare worker visit is completed.

12. The haptic healthcare patient garment of claim 7, wherein the cloth is configured to present a color commanded by the processor and the application causes the color of the cloth to change in a wave coordinated with the sequence of activation of the actuators.

13. The haptic healthcare patient garment of claim 7, wherein the application, when executed by the processor, detects an adverse condition of the patient based on indications received from the sensors and transmits an alarm message via the radio transceiver to a healthcare worker.

14. The haptic healthcare patient garment of claim 1, wherein the smart healthcare garment is a blanket.

15. The haptic healthcare patient garment of claim 1, wherein the smart healthcare garment is a jacket.

16. The haptic healthcare patient garment of claim 1, wherein the heaters are electric resistance type heaters.

17. The haptic healthcare patient garment of claim 1, wherein the heaters are far infrared wave type heaters.

18. The haptic healthcare patient garment of claim 1, further comprising a plurality of actuators retained by the cloth, wherein the application, when executed by the processor:

receives via the radio transceiver a command to give the patient wearing the smart healthcare garment a hug, and commands the actuators to activate, whereby a hug is administered to the patient.

19. The haptic healthcare patient garment of claim 1, wherein the smart healthcare garment is a jacket or a blanket.

\* \* \* \* \*